(12) United States Patent
G

(10) Patent No.: US 11,152,859 B2
(45) Date of Patent: Oct. 19, 2021

(54) SYNCHRONOUS VOLTAGE REGULATORS

(71) Applicant: INTEL CORPORATION, Santa Clara, CA (US)

(72) Inventor: Govindaraj G, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 15/855,656

(22) Filed: Dec. 27, 2017

(65) Prior Publication Data

US 2019/0199217 A1 Jun. 27, 2019

(51) Int. Cl.
  *H02M 3/158* (2006.01)
  *G06F 1/28* (2006.01)
  *H02M 1/14* (2006.01)

(52) U.S. Cl.
  CPC ............ *H02M 3/1584* (2013.01); *G06F 1/28* (2013.01); *H02M 1/14* (2013.01); *H02M 3/1586* (2021.05)

(58) Field of Classification Search
  CPC .................................................. H02M 3/1584
  See application file for complete search history.

(56) References Cited

U.S. PATENT DOCUMENTS

| | | | | |
|---|---|---|---|---|
| 4,437,146 A | * | 3/1984 | Carpenter | H02M 1/4225 323/222 |
| 10,090,765 B1 | * | 10/2018 | Kanzian | H02M 3/1584 |
| 2008/0019436 A1 | * | 1/2008 | Wu | H02M 3/1584 375/238 |
| 2013/0114306 A1 | * | 5/2013 | Kooken | H02M 1/10 363/21.01 |
| 2013/0335050 A1 | * | 12/2013 | Fujiwara | H02M 1/08 323/283 |
| 2014/0042812 A1 | * | 2/2014 | Tan | H02M 3/1584 307/43 |
| 2015/0002115 A1 | * | 1/2015 | Shenoy | H02M 3/158 323/271 |
| 2019/0068054 A1 | * | 2/2019 | Ongaro | H02M 1/08 |

OTHER PUBLICATIONS

Roh et al., "A Multiphase Synchronous Buck Converter With a Fully Integrated Current Balancing Scheme," IEEE Transactions on Power Electronics, Sep. 2015, 11 pages, vol. 30, No. 9, USA, pp. 5159-5169.

* cited by examiner

Primary Examiner — Peter M Novak
(74) Attorney, Agent, or Firm — Schwabe, Williamson & Wyatt, P.C.

(57) ABSTRACT

In some examples, a system includes a battery, a first voltage regulator with an input, and a second voltage regulator with an input. The input of the second voltage regulator is shifted in phase relative to the input of the first voltage regulator.

28 Claims, 12 Drawing Sheets

100

200

300

400

500

600

700

800

900

SYNCHRONOUS VOLTAGE REGULATORS

TECHNICAL FIELD

This disclosure relates generally to synchronizing voltage regulators.

BACKGROUND

Many computing systems (for example, portable or mobile systems) use a battery to provide power to the system. Since battery power can be limited by size, systems can be designed to efficiently utilize available power. The battery can power the system at a particular voltage that is dependent on battery chemistry and a number of battery cells arranged in series with each other, for example. Battery voltage can be converted to voltage levels needed by the system using switching regulators (for example, switching regulators each operating from 1 volt to 5 volts). In operation, switching regulators can draw power from the battery. In the process of drawing power from the battery, switching regulators may introduce a ripple voltage at an input of the regulators.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Figure 1:
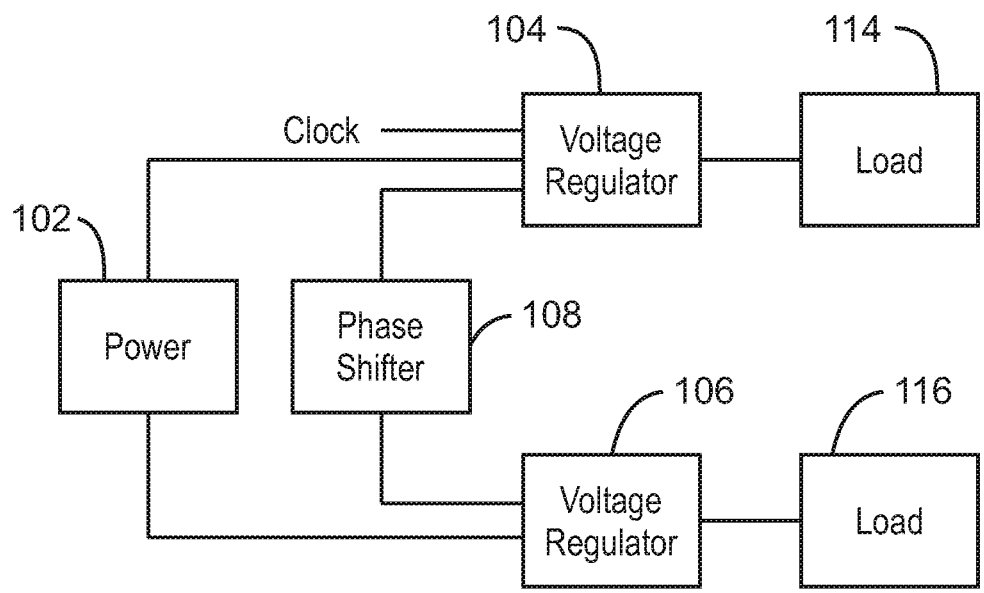
FIG. 1 illustrates a voltage regulator system.

Some embodiments relate to synchronizing voltage regulators. Some embodiments relate to reducing battery voltage ripple using synchronous voltage regulators.

As discussed above, many computing systems (for example, portable or mobile systems) use a battery to provide power to the system. Since battery power can be limited by size, systems can be designed to efficiently utilize available power. The battery can power the system at a particular voltage that is dependent on battery chemistry and a number of battery cells arranged in series with each other, for example. Battery voltage can be converted to voltage levels needed by the system using switching voltage regulators (for example, switching voltage regulators each operating from 1 volt to 5 volts). In operation, switching voltage regulators can draw power from the battery. In the process of drawing power from the battery, switching voltage regulators may introduce a ripple voltage at an input of the regulators. Such a ripple voltage can be caused by load behavior or the switching voltage regulator.

Ripple voltage can be exhibited at the battery, for example, due to a ripple current. The ripple voltage or the ripple current can be proportional to a control loop of one or more switching voltage regulator. Cyclic current discharge can cause ohmic heating losses that reduce a cycle life of the battery and can impact a usable capacity of the battery.

One strategy for reducing input voltage ripple may be to add capacitors for each voltage regulator. Adding capacitors can impact the board area and cost of implementation. Although the voltage ripple might be reduced using extra capacitors for each voltage regulator, board space cost would likely be increased. Further, the additional capacitors may be large in size and have a high voltage rating. Addition of capacitors might only transfer the power dissipation problem from the power source (such as a battery) to the capacitor(s). Due to the additional capacitors and the equivalent series resistance (ESR) of the capacitors, power would be dissipated during the ripple cycles.

Another way to reduce voltage ripple can be implemented according to some embodiments. In some embodiments, ripple such as voltage ripple or battery ripple can be reduced by synchronizing switching voltage regulators. For example, switching voltage regulators can be synchronized as per the phase and magnitude of the ripple that one or more voltage regulator might cause. This can reduce a phase and magnitude of the ripple (for example, a ripple caused by one or more of the voltage regulators). In some embodiments, voltage regulators can be synchronized by using one single switching frequency for a computing platform and introducing a lag (or phase angle) between clocks that control two or more voltage regulators in the system. For example, in some embodiments, a network of clocks are used to enable switching voltage regulators (or voltage regulators) based on specifications of one or more voltage regulators and the potential loads that can be connected to the one or more voltage regulators.

In some embodiments, two or more voltage regulators can be operated out of phase with respect to each other. In this manner, a net ripple voltage introduced by the power source (for example, such as a battery) can be reduced to a system load behavior. Load behavior at higher frequencies can be addressed, for example, by edge capacitors, and only a lower frequency component of the load behavior may be transferred to an input or battery cell. In some embodiments, a reduction in ripple voltage can enable higher battery cycles and battery life.

Some embodiments include a fully integrated voltage regulator (FIVR) implementation in which, for example, one or more voltage regulators are incorporated within an integrated circuit (IC) such as a system on a chip (SoC). In some embodiments (such as an FIVR implementation), ripple voltage or ripple current can be reduced (for example, using information about the workload or load behavior using an optimization of phase lag). Using an IC such as an SoC with an FIVR implementation along with knowledge of the workload or load behavior, phase lag can be optimally utilized for reducing ripple voltage (or ripple current).

In some embodiments, independent clocks can be used for two or more voltage regulators. In some embodiments, clock synchronized voltage regulators can be used to reduce battery ripple voltage when the clock is synchronized between the voltage regulators.

In some embodiments, in an integrated circuit core based system with an FIVR implementation, a majority of active power can be fed by one or more voltage regulator (for example, one or more voltage regulator internal to an IC or an SoC), which has its own clock. A clock signal can be provided as an output of the internal voltage regulator, with an appropriate phase difference (for example, in some embodiments, 90 degrees or 180 degrees) from that of the internal clock signal. The output clock signal with the phase angle difference can be used to enable one or more voltage regulators external to the IC or SoC (for example, to enable one or more platform voltage regulators). The clock signal can enable the external voltage regulators with known phase shifts, and can enable further distribution of any battery ripple behavior.

In some embodiments, a phase shifter can be a passive device which can provide a fixed angle phase for one or more respective voltage regulator, and provide a dynamic shift angle. In some embodiments, this can be implemented without compromising voltage regulator stability. In some embodiments, an input voltage ripple can be reduced using such a phase shifter. In some embodiments, the phase shifter is a passive device that provides a fixed angle of phase for one or more respective voltage regulator. In some embodiments, the phase shifter can acquire feedback from one or more respective voltage regulator to provide a dynamic angle shift. In some embodiments, the phase shifter can acquire feedback from one or more respective load associated with one or more respective voltage regulator to provide the dynamic angle shift. In some embodiments, the dynamic angle shift can be provided without compromising voltage regulator stability, while reducing input voltage ripple.

In some embodiments, a phase angle shift can be an independent solution to control voltage ripple or current ripple. In some embodiments, a phase angle shift can be aligned with a system charger solution that can control overall ripple (for example, voltage ripple or current ripple) of a system.

In some embodiments, ripple such as ripple current or ripple voltage (for example, battery ripple) can be reduced in a system powered by one or more battery and multiple voltage regulators. In some embodiments, such ripple can be reduced in a system such as, for example, a computing system, a mobile computing system, a laptop computer, a tablet computer, a phone, or a projector, among others.

In some embodiments, a clock sync signal can be used (for example, one or more clock pins or clock sync pins of one or more voltage regulators). In some embodiments, phase shift of one or more voltage regulators is implemented using synchronized clock signals. In some embodiments, clock signals used by one or more voltage regulators are synchronized. In some embodiments, clock signal phase shift is implemented between synchronized voltage regulators.

FIG. 1 illustrates a system 100 including power 102 (for example, a power source, a voltage source, a battery, or other type of source, among others), a first voltage regulator 104 and a second voltage regulator 106. In some embodiments, one or more of voltage regulators 104 and 106 are a shifting voltage regulator. System 100 also includes a phase shifter 108, a load 114, and a load 116. Load 114 illustrates a load coupled to voltage regulator 104 and load 116 illustrates a load coupled to voltage regulator 106.

A clock signal (or other input signal in some embodiments) is provided to first voltage regulator 104. For example, the clock signal is provided to a clock input of voltage regulator 104. Voltage regulator 104 provides a clock output signal to phase shifter 108. Phase shifter 108 receives an output (for example, a clock output) from voltage regulator 104, and provides an input (for example, a clock input) to voltage regulator 106 to reduce the ripple voltage (or ripple current). Phase shifter 108 shifts a phase signal between the two or more voltage regulators (for example, voltage regulators 104 and 106, and in some embodiments additional voltage regulators not shown in FIG. 1) to help reduce a ripple voltage or ripple current (for example, a ripple voltage or a ripple current from the power source). This ripple current can be, for example, ripple introduced to the battery by one or more of the voltage regulators 104 and 106.

In some embodiments, ripple such as voltage ripple or battery ripple can be reduced by synchronizing voltage regulators 104 and 106. In some embodiments, voltage regulators 104 and 106 are switching voltage regulators. For example, in some embodiments, switching voltage regulators 104 and 106 are synchronized as per the phase and magnitude of the ripple that one or more of the voltage regulators 104 and 106 might cause. This can reduce a phase and magnitude of the ripple (for example, a ripple caused by one or more of the voltage regulators 104 and 106). In some embodiments, voltage regulators 104 and 106 can be synchronized by using one single switching frequency for a computing platform and introducing a lag (or phase angle) between clocks that control two or more voltage regulators in the system (for example, two or more voltage regulators including voltage regulator 104 and voltage regulator 106). For example, in some embodiments, a network of clocks are used to enable voltage regulators 104 and 106 based on specifications of one or more voltage regulators and the potential loads that can be connected to the one or more voltage regulators.

In some embodiments, voltage regulators 104 and 106 can be operated out of phase with respect to each other. In this manner, a net ripple voltage introduced by the power source 102 (for example, such as a battery) can be reduced to a system load behavior. Load behavior at higher frequencies can be addressed, for example, by edge capacitors, and only a lower frequency component of the load behavior may be transferred to an input or battery cell. In some embodiments, a reduction in ripple voltage can enable higher battery cycles and battery life.

Figure 2:
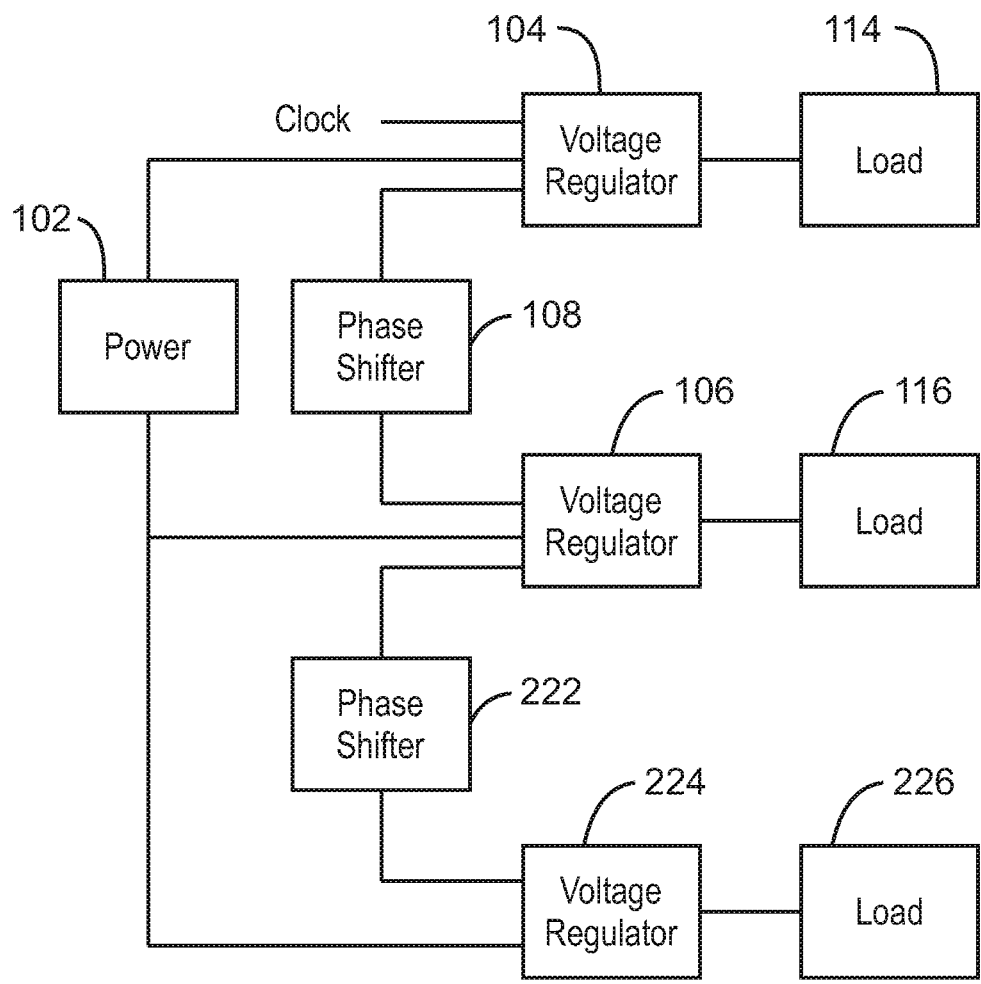
FIG. 2 illustrates a voltage regulator system.

FIG. 2 illustrates a system 200 including power 102, voltage regulator 104, voltage regulator 106, phase shifter 108, load 114, and load 116, which are the same as or similar to like numbered elements illustrated in FIG. 1, and additionally including a phase shifter 222, a voltage regulator 224 (for example, a shifting voltage regulator), and a load 226. In some embodiments, voltage regulator 106 includes an output (for example, a clock output) provided to phase shifter 222. Phase shifter 222 receives the output from voltage regulator 106 and provides an input (for example, a clock input) to voltage regulator 224. Phase shifter 222 shifts a phase signal between the two or more voltage regulators (for example, between voltage regulators 106 and 224, and in some embodiments additional voltage regulators not shown in FIG. 2) to help reduce a ripple voltage or ripple current (for example, a ripple voltage or a ripple current from the power source 102). This ripple current can be, for example, ripple introduced to the battery by one or more of the voltage regulators 104, 106 and 224. Phase shifter 222 receives an output such as a clock output, and provides an input such as a clock input to voltage regulator 106 to reduce ripple voltage (or ripple current). In some embodiments, system 200 can include additional phase shifters and voltage regulators. For example, an additional phase shifter can receive an output from voltage regulator 224 and provide an input to another voltage regulator. This can be implemented to further shift a phase signal between additional voltage regulators. Any number of voltage regulators or any number of phase shifters can be included in system 200 according to some embodiments.

Figure 3:
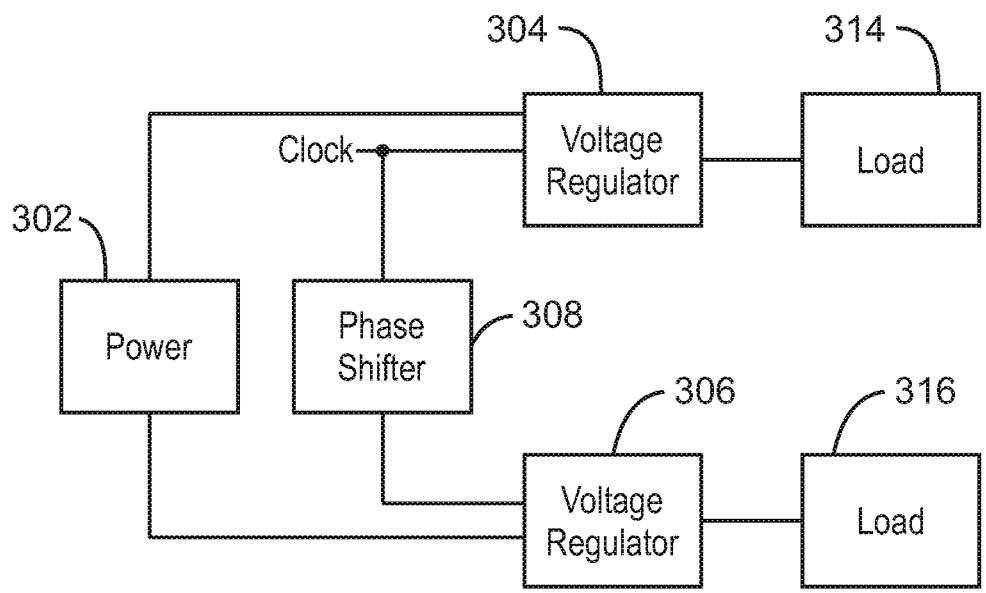
FIG. 3 illustrates a voltage regulator system.

FIG. 3 illustrates a system 300 including power 302 (for example, a power source, a voltage source, a battery, or other type of source, among others), a first voltage regulator 304 and a second voltage regulator 306. In some embodiments, one or more of voltage regulators 304 and 306 are a shifting voltage regulator. System 300 also includes a phase shifter 308, a load 314, and a load 316. Load 314 illustrates a load coupled to voltage regulator 304 and load 316 illustrates a load coupled to voltage regulator 306.

A clock signal (or other input signal in some embodiments) is provided to first voltage regulator 304. For example, the clock signal is provided to a clock input of voltage regulator 304. The clock signal (or other signal) input to voltage regulator 304 is also provided to phase shifter 308. Phase shifter 308 receives the input signal (for example, clock input signal) and provides an input (for example, a clock input) to voltage regulator 306 to reduce the ripple voltage (or ripple current). Phase shifter 308 shifts a phase signal between two or more voltage regulators (for example, voltage regulators 304 and 306, and in some embodiments additional voltage regulators not shown in FIG. 3) to help reduce a ripple voltage or ripple current (for example, a ripple voltage or a ripple current from the power source). This ripple current can be, for example, ripple introduced to the battery by one or more of the voltage regulators 304 and 306.

Figure 4:
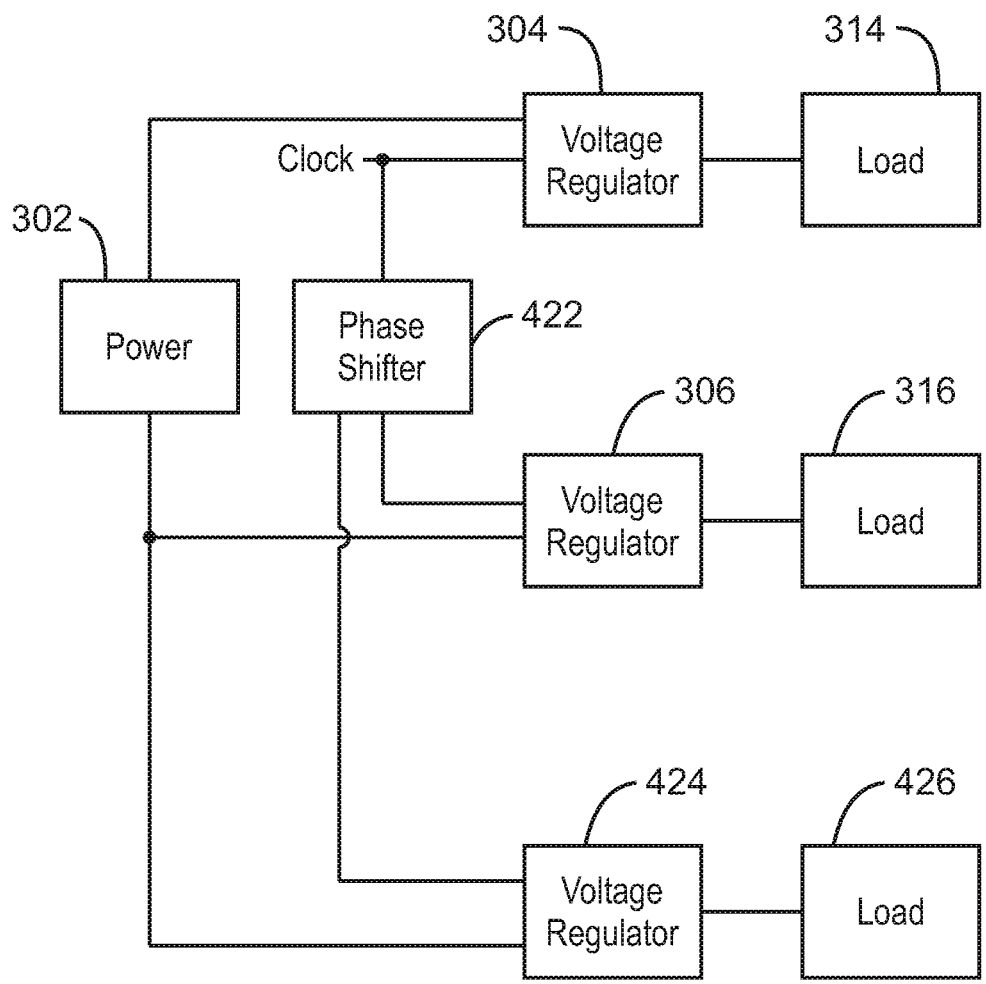
FIG. 4 illustrates a voltage regulator system.

FIG. 4 illustrates a system 400 including power 302, voltage regulator 304, voltage regulator 306, load 314, and load 316, which are the same as or similar to like numbered elements illustrated in FIG. 3, and additionally including a phase shifter 422, a voltage regulator 424 (for example, a shifting voltage regulator), and a load 426. In some embodiments, the input signal provided to voltage regulator 304 (for example, a clock input signal) is provided to phase shifter 422. Phase shifter 422 receives the input signal and provides an input (for example, a clock input) to voltage regulator 306, and also provides an input (for example, a clock input) to voltage regulator 424. Phase shifter 422 shifts a phase signal between two or more voltage regulators (for example, between voltage regulators 304, 306, and 424, and in some embodiments additional voltage regulators not shown in FIG. 4) to help reduce a ripple voltage or ripple current (for example, a ripple voltage or a ripple current from the power source 302). This ripple current can be, for example, ripple introduced to the battery by one or more of the voltage regulators 304, 306 and 424. In some embodiments, system 400 can include additional voltage regulators, and phase shifter 422 can provide additional input signals to each of the additional voltage regulators. For example, phase shifter 422 can receive the input signal and provide an input to any number of other voltage regulators in some embodiments. In some embodiments, each of the input signals can further shift a phase signal between voltage regulators. For example, each voltage regulator can receive a different phase shift signal from phase shifter 422. Any number of voltage regulators can be included in system 400 according to some embodiments.

Figure 5:
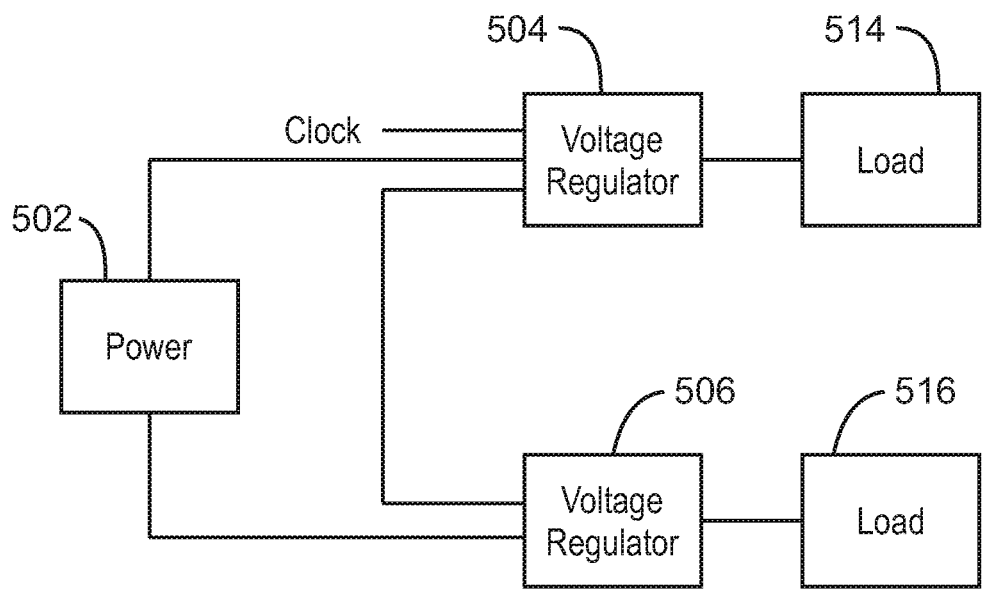
FIG. 5 illustrates a voltage regulator system.

FIG. 5 illustrates a system 500 including power 502 (for example, a power source, a voltage source, a battery, or other type of source, among others), a first voltage regulator 504 and a second voltage regulator 506. In some embodiments, one or more of voltage regulators 504 and 506 are a shifting voltage regulator. System 500 also includes a load 514 and a load 516. Load 514 illustrates a load coupled to voltage regulator 504 and load 516 illustrates a load coupled to voltage regulator 506.

A clock signal (or other input signal in some embodiments) is provided to first voltage regulator 504. For example, the clock signal is provided to a clock input of voltage regulator 504. In some embodiments, voltage regulator 504 includes a phase shifter that receives the input signal (for example, clock input signal) and provides an output that is input (for example, as a clock input) to voltage regulator 506 to reduce the ripple voltage (or ripple current). The phase shifter within voltage regulator 504 shifts a phase signal between two or more voltage regulators (for example, voltage regulators 504 and 506, and in some embodiments additional voltage regulators not shown in FIG. 5) to help reduce a ripple voltage or ripple current (for example, a ripple voltage or a ripple current from the power source). This ripple current can be, for example, ripple introduced to the battery by one or more of the voltage regulators 504 and 506.

Figure 6:
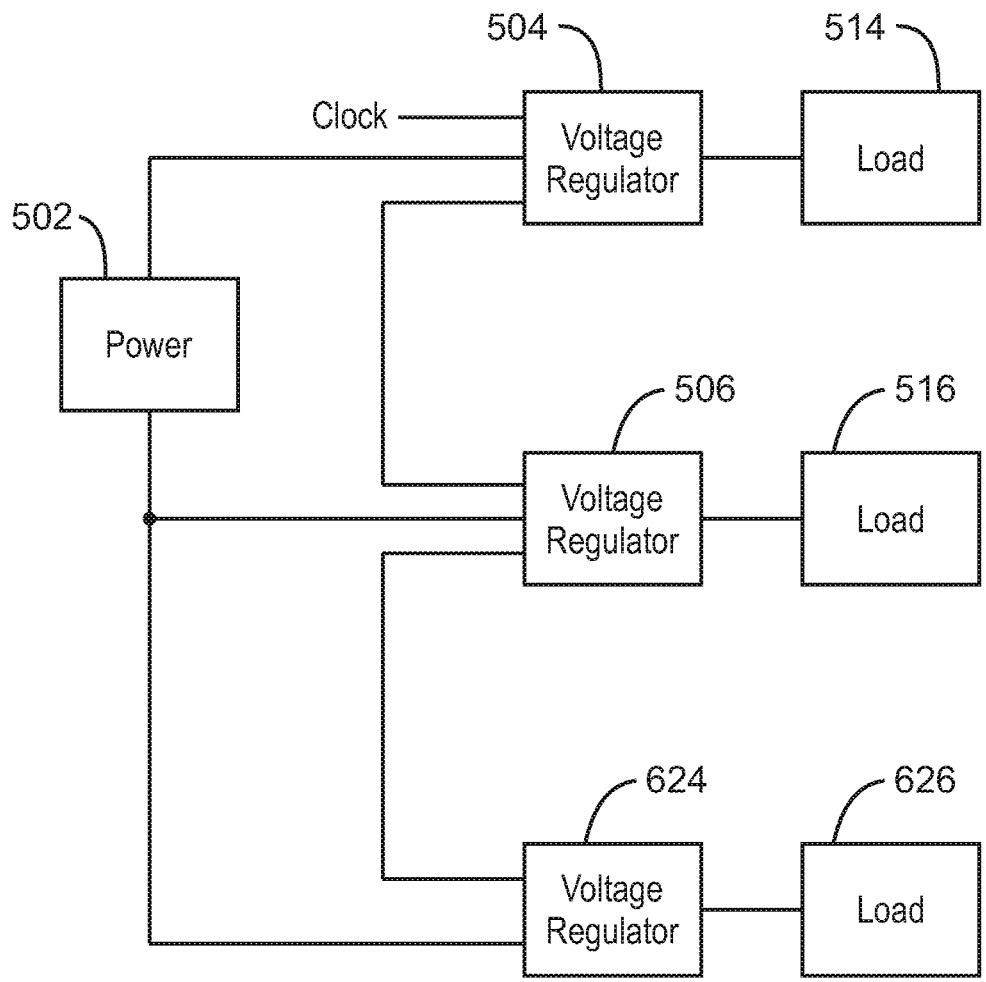
FIG. 6 illustrates a voltage regulator system.

FIG. 6 illustrates a system 600 including power 502, voltage regulator 504, voltage regulator 506, load 514, and load 516, which are the same as or similar to like numbered elements illustrated in FIG. 5, and additionally including a voltage regulator 624 (for example, a shifting voltage regulator), and a load 626. In some embodiments, voltage regulator 506 receives the input signal (for example, clock input signal) and provides an input (for example, a clock input) to voltage regulator 624. Voltage regulator 506 shifts a phase signal between two or more voltage regulators (for example, between voltage regulators 506 and 624, and in some embodiments additional voltage regulators not shown in FIG. 6) to help reduce a ripple voltage or ripple current (for example, a ripple voltage or a ripple current from the power source 502). This ripple current can be, for example, ripple introduced to the battery by one or more of the voltage regulators 504, 506 and 624. In some embodiments, system 600 can include additional voltage regulators, and voltage regulators can provide additional input signals to each of the additional voltage regulators. For example, voltage regulator 624 can receive the input signal and provide an input to any number of other voltage regulators in some embodiments. In some embodiments, each of the input signals can further shift a phase signal between voltage regulators. For example, each voltage regulator can receive a different phase shift signal. Any number of voltage regulators can be included in system 600 according to some embodiments.

Figure 7:
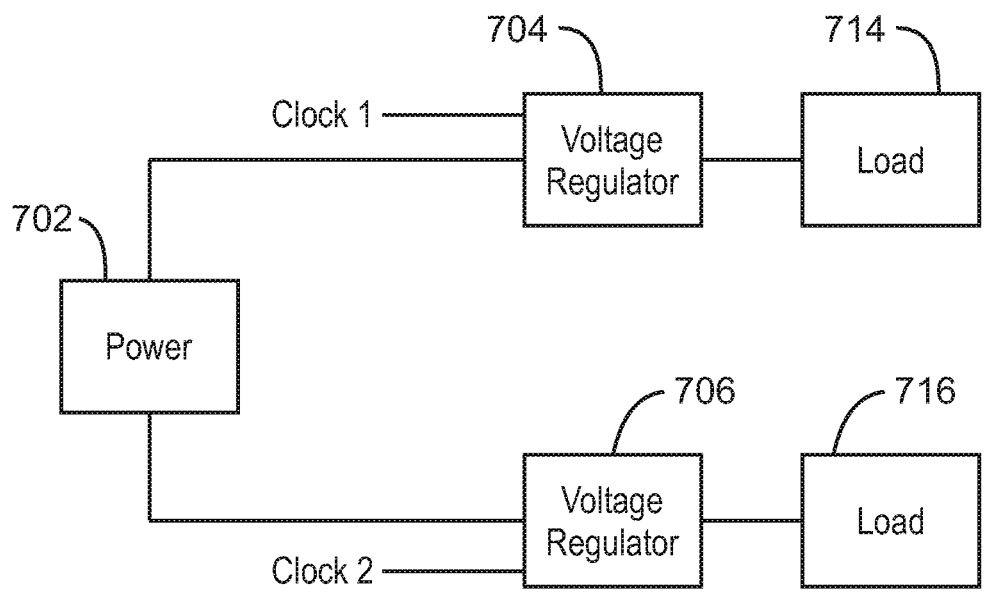
FIG. 7 illustrates a voltage regulator system.

FIG. 7 illustrates a system 700 including power 702 (for example, a power source, a voltage source, a battery, or other type of source, among others), a first voltage regulator 704 and a second voltage regulator 706. In some embodiments, one or more of voltage regulators 704 and 706 are a shifting voltage regulator. System 700 also includes a load 714 and a load 716. Load 714 illustrates a load coupled to voltage regulator 704 and load 716 illustrates a load coupled to voltage regulator 706.

A clock signal Clock 1 (or other input signal in some embodiments) is provided to first voltage regulator 704. For example, the clock signal Clock 1 is provided to a clock input of voltage regulator 704. In some embodiments, a second input signal (for example, clock input signal Clock 2) is input (for example, as a clock input) to voltage regulator 706 to reduce the ripple voltage (or ripple current). The second input signal is a shifted phase signal relative to the first input signal in order to provide a shifted phase signal between two or more voltage regulators (for example, voltage regulators 704 and 706, and in some embodiments additional voltage regulators not shown in FIG. 7) to help reduce a ripple voltage or ripple current (for example, a ripple voltage or a ripple current from the power source). This ripple current can be, for example, ripple introduced to the battery by one or more of the voltage regulators 704 and 706. In some embodiments, the first input signal and the second input signal are provided from a network of input signals (for example, from a network of clocks) used to enable voltage regulators 704 and 706 based on specifications of one or more voltage regulators and the potential loads that can be connected to the one or more voltage regulators.

Figure 8:
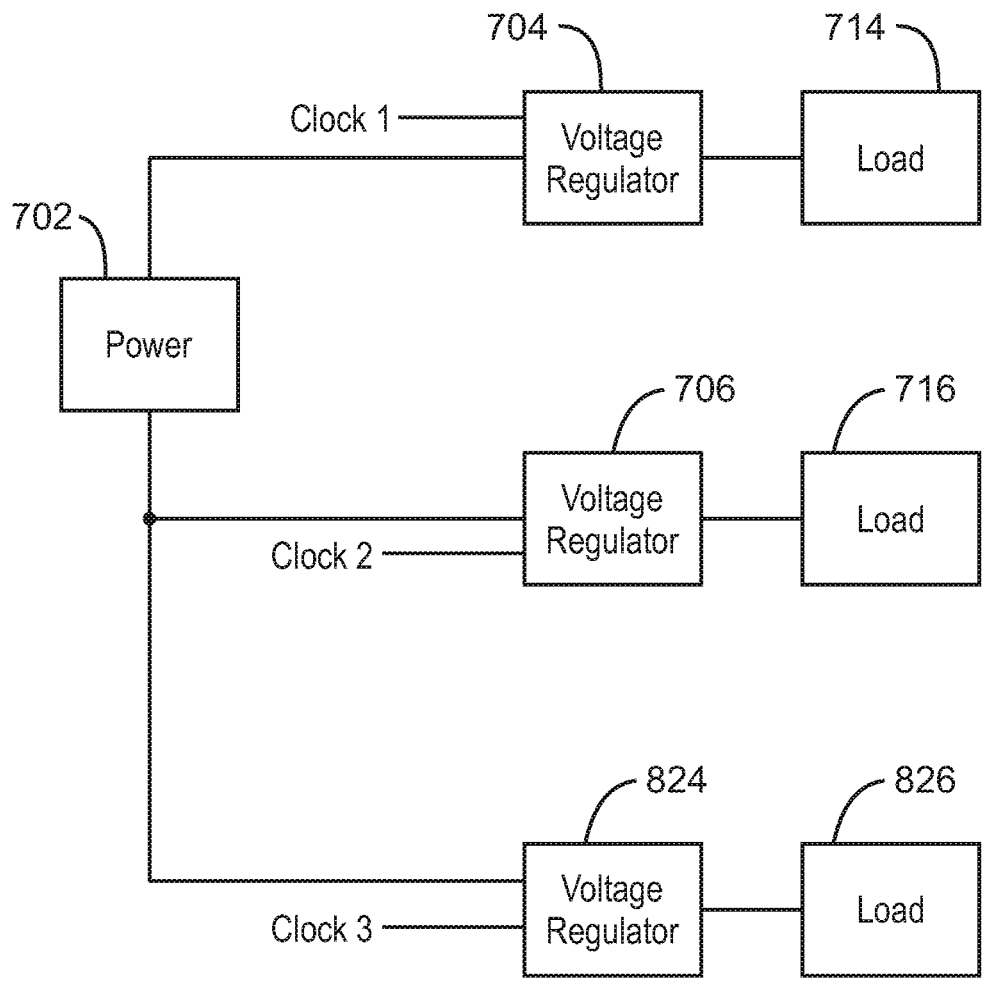
FIG. 8 illustrates a voltage regulator system.

FIG. 8 illustrates a system 800 including power 702, voltage regulator 704, voltage regulator 706, load 714, and load 716, which are the same as or similar to like numbered elements illustrated in FIG. 7, and additionally including a voltage regulator 824 (for example, a shifting voltage regulator), and a load 826. In some embodiments, voltage regulator 824 receives a third input signal (for example, clock input signal Clock 3). The third input signal Clock 3 is a shifted phase signal relative to the first input signal Clock 1, relative to the second input signal Clock 2, or relative to both the first input signal Clock 1 and the second input signal Clock 2 in order to provide a shifted phase signal between two or more voltage regulators (for example, voltage regulators 704, 706, and 824, and in some embodiments additional voltage regulators not shown in FIG. 8). The shifted phase signal(s) can help reduce a ripple voltage or ripple current (for example, a ripple voltage or a ripple current from the power source 702). This ripple current can be, for example, ripple introduced to the battery by one or more of the voltage regulators 704, 706 and 824. In some embodiments, system 800 can include additional voltage regulators, and each voltage regulator can receive an additional input signal. In some embodiments, each of the input signals can further shift a phase signal between voltage regulators. For example, each voltage regulator can receive a different phase shift signal. Any number of voltage regulators can be included in system 800 according to some embodiments.

Figure 9:
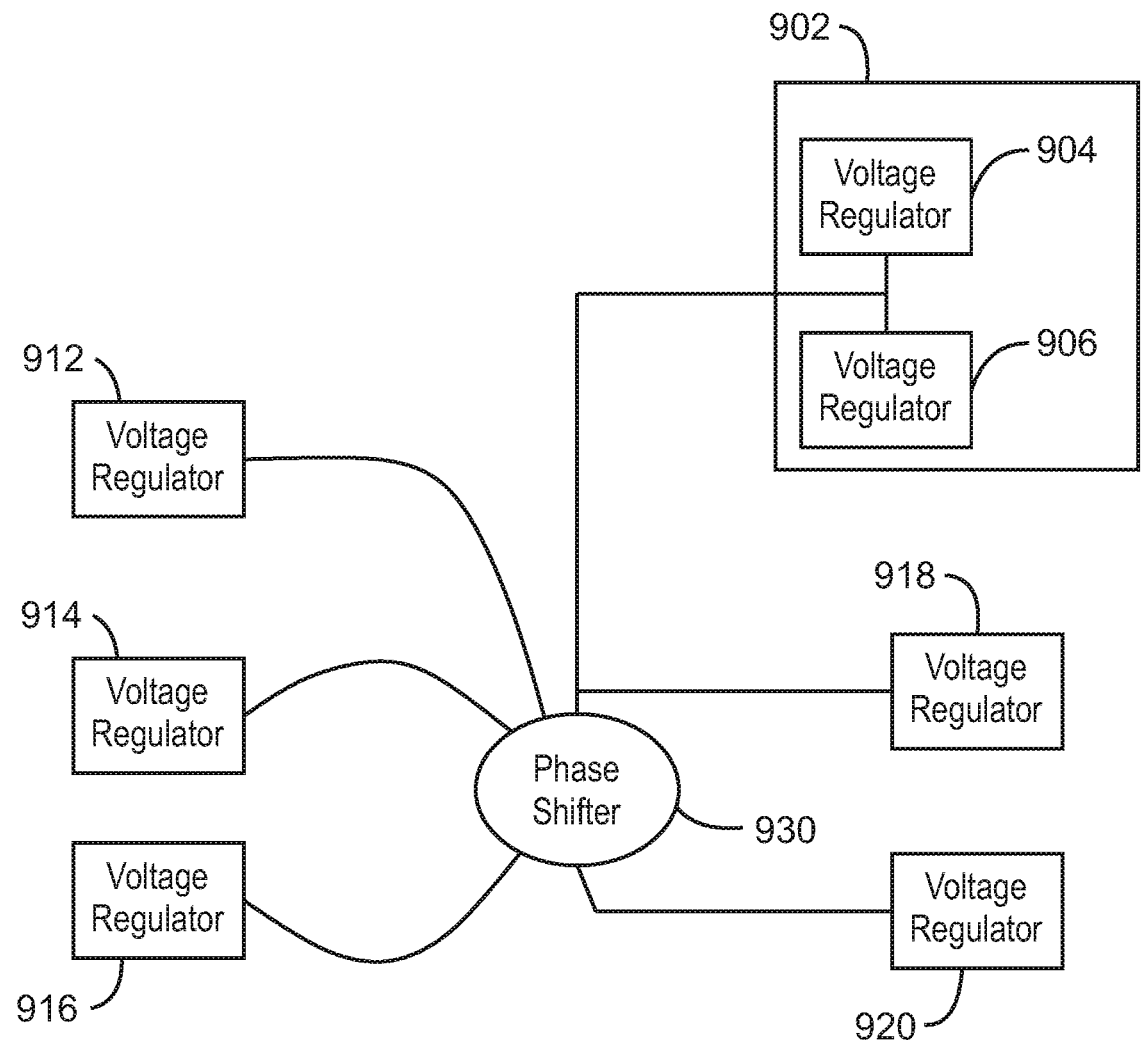
FIG. 9 illustrates a voltage regulator system.

FIG. 9 illustrates system 900 according to some embodiments. In some embodiments, system 900 includes a device 902 such as, for example, an integrated circuit (IC), an SoC (System on Chip), a microprocessor, or some other device. Device 202 includes a voltage regulator 902 and a voltage regulator 904. In some embodiments, voltage regulator 902 and voltage regulator 904 are fully integrated voltage regulators (FIVRs). System 900 also includes a number of voltage regulators 912, 914, 916, 918 and 920 (for example, platform level voltage regulator or system level voltage regulators) that are external to device 902 (for example, external to an integrated circuit such as a system on a chip). For example, in some embodiments, voltage regulators can include voltage regulators providing different voltages to be provided to various system components. In some embodiments, external voltage regulators 912, 914, 916, 918 and 920 can include, for example, a 1.0V VR, a 1.8V VR, a 3.3V VR, a 5.0V VR, a core voltage VR, among others.

A phase shifter 930 can shift a phase of a signal provided to one or more the external voltage regulators 912, 914, 916, 918, or 920. In some embodiments, phase shifter 930 can synchronize two or more of the voltage regulators 904, 906, 912, 914, 916, 918 and 920 of system 900. In some embodiments, any number of voltage regulators 904 and 906 can be included within device 202. In some embodiments, any number of external voltage regulators 912, 914, 916, 918 and 920 can be included. In some embodiments, one or more phase shifters 930 can shift a phase of a signal provided to the external voltage regulators (for example, different phases for each of the external voltage regulators).

In some embodiments, system 900 is a fully integrated voltage regulator (FIVR) implementation in which, for example, one or more voltage regulators 904 and 906 are incorporated within an integrated circuit 902 (for example, such as a system on a chip). In some embodiments, system 900 is an FIVR implementation in which ripple voltage or ripple current can be reduced. This reduction in ripple voltage or ripple current can be implemented, for example, using information about the workload or load behavior using an optimization of phase lag. Using a device 902 such as an IC with an FIVR implementation along with knowledge of the workload or load behavior, phase lag can be optimally utilized for reducing ripple voltage (or ripple current).

In some embodiments, in an integrated circuit core based system such as system 900 with an FIVR implementation, a majority of active power can be fed by one or more voltage regulator (for example, one or more voltage regulator internal to an IC such as voltage regulator 904 or voltage regulator 906), or any other voltage regulator which has its own clock. A clock signal can be provided as an output of the internal voltage regulator 904 or 906, with an appropriate phase difference (for example, in some embodiments, 90 degrees or 180 degrees) from that of the internal clock signal. The output clock signal with the phase angle difference can be used to enable one or more voltage regulators 912, 914, 916, 918 or 920 that are external to the IC (for example, to enable one or more platform voltage regulators). The clock signal can enable the external voltage regulators 912, 914, 916, 918 or 920 with known phase shifts, and can enable further distribution of any battery ripple behavior.

In some embodiments, voltage regulators 904 and 906 can be a FIVR core and an FIVR uncore. In some embodiments, system 900 can be a core based system with an FIVR implementation where a majority of the active scenario power is fed by an internal regulator of device 902 (for example, an internal regulator of IC 902), which has its own clock. That same clock can be provided as an output with an appropriate phase difference from the device 902 (for example, from the IC 902 or from the SoC 902). This clock can enable the platform voltage regulators 912, 914, 916, 918 and 920 with known phase shifts, enabling further distribution in the voltage ripple behavior (or current ripple behavior, or batter ripple behavior, for example).

In some embodiments, phase shifter 930 enables the external voltage regulators with known phase shifts. For example, in some embodiments, phase shifter 930 can be a passive device that provides a fixed angle phase for each respective voltage regulator.

In some embodiments, phase shifter 930 enables the external voltage regulators with dynamic phase shifts. For example, in some embodiments, phase shifter 930 can further acquire feedback from the respective voltage regulator and provide a dynamic angle shift. This can be implemented according to some embodiments without compromising voltage regulator stability while optimizing input voltage ripple.

In some embodiments, phase shifter 930 can be a phase angle provider that is an independent solution. In some embodiments, phase shifter 930 can be a phase angle provider aligned with a system charger solution that can control overall ripple of the system 900. In some embodiments, system 900 can use a clock sync pin and appropriate phase shift for each of the voltage regulators. In some embodiments, any of the systems or portions of the systems illustrated and described herein can be implemented in system 900, for example.

Figure 10:
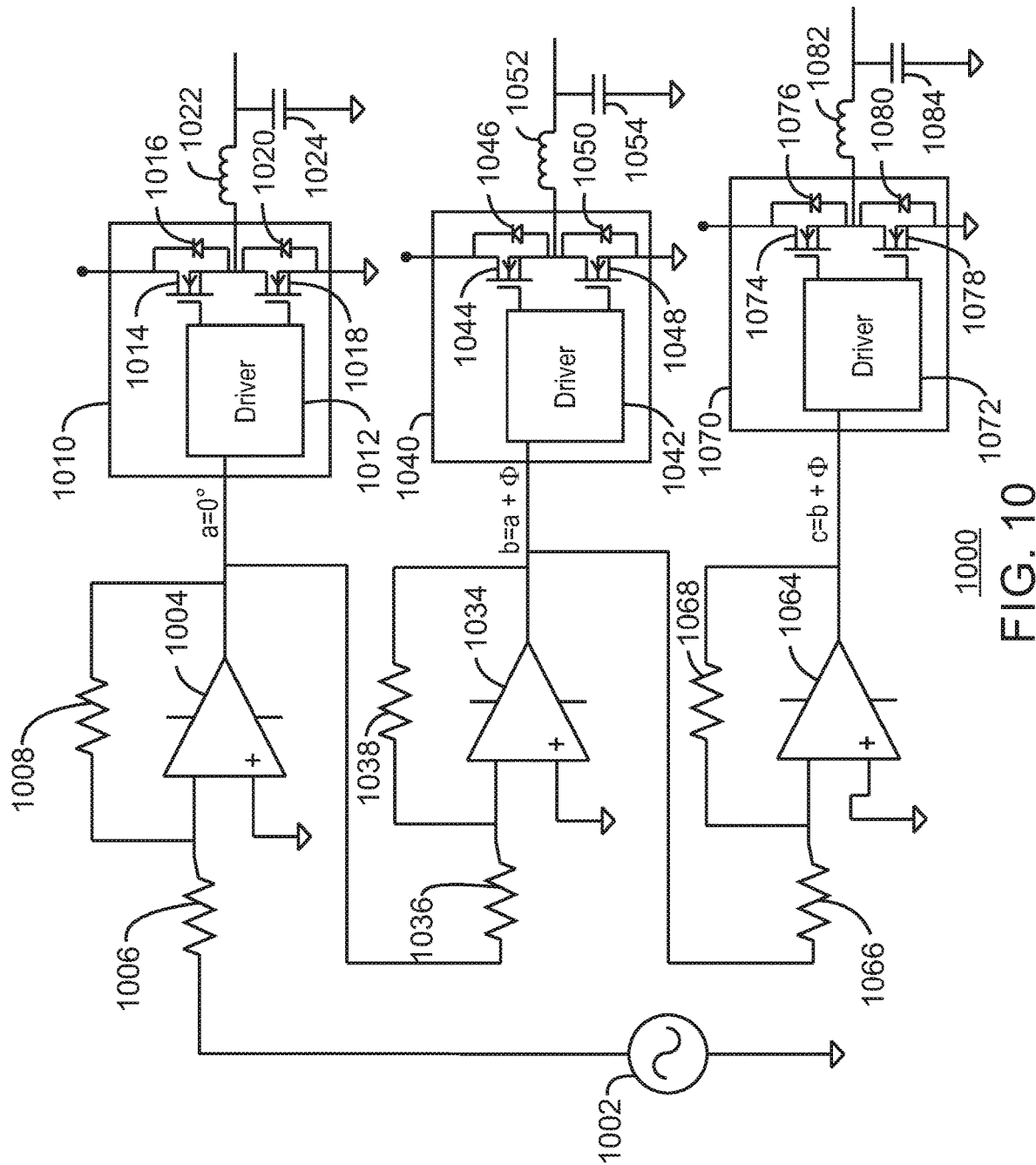
FIG. 10 illustrates a voltage regulator system.

FIG. 10 illustrates a system 1000 in accordance with some embodiments. System 1000 includes power 1002, an operational amplifier (Opamp) 1004, a resistor 1006, a resistor 1008 and a voltage regulator 1010 (for example, a shifting voltage regulator 1010). Voltage regulator 1010 includes a driver 1012, a transistor 1014, a diode 1016, a transistor 1018, and a diode 1020. An inductor 1022 and a capacitor 1024 are coupled to an output of voltage regulator 1010.

System 1000 also includes an operational amplifier (Opamp) 1034, a resistor 1036, a resistor 1038 and a voltage regulator 1040 (for example, a shifting voltage regulator 1040). Voltage regulator 1040 includes a driver 1042, a transistor 1044, a diode 1046, a transistor 1048, and a diode 1050. An inductor 1052 and a capacitor 1054 are coupled to an output of voltage regulator 1040.

System 1000 also includes an operational amplifier (Opamp) 1064, a resistor 1066, a resistor 1068 and a voltage regulator 1070 (for example, a shifting voltage regulator 1070). Voltage regulator 1070 includes a driver 1072, a transistor 1074, a diode 1076, a transistor 1078, and a diode 1080. An inductor 1082 and a capacitor 1084 are coupled to an output of voltage regulator 1070.

System 1000 provides a phase angle shift for voltage regulators 1010, 1040 and 1070 according to some embodiments (for example, using an operational amplifier or Opamp solution). A phase angle change is implemented at a fixed angle using operational amplifiers 1004, 1034, and 1064. Op Amp 1004 can send an output at a same angle as the voltage source, for example, as shown by "a=0°". Op Amp 1034 can send an output shifted at a fixed angle (for example, at an angle 90 degrees or 180 degrees relative to that of Op Amp 1004). For example, in some embodiments, this is shown in FIG. 10 by "b=a+$\phi$". Op Amp 1064 can shift an output of Op Amp 1034 at a phase angle relative to that of Op Amp 1034 (for example, at a same relative phase angle as between the outputs of Op Amp 1004 and of Op Amp 1034). This can be shown in some embodiments as "c=b+$\phi$". In some embodiments, a fixed angle is used (for example, fixed angle $\phi$), and the angle is equal between multiple voltage regulators in some embodiments.

FIG. 10 illustrates a phase angle change at a fixed angle (for example, at fixed angle $\phi$ according to some embodiments) using one or more operational amplifier (that is, one or more OpAmp). In accordance with some embodiments, the first OpAmp 1004 can send the output at the same angle as the source (for example, the same angle as the source 1002), the second OpAmp 1034 can shift by a fixed angle (for example, can shift by a fixed angle $\phi$), and the third OpAmp 1064 can shift the second OpAmp 1034 output with another fixed angle (for example, can shift by the same fixed angle $\phi$). In some embodiments, the fixed angle is the same between the multiple voltage regulators. In some embodiments, additional voltage regulators can be included in system 1000. In some embodiments, additional OpAmps can be included in system 1000 to shift a fixed angle between additional voltage regulators. It is noted that system 1000 of FIG. 10 is one embodiment based on an OpAmp solution, and that in other embodiments phase angle shift can be implemented in different ways.

Figure 11:
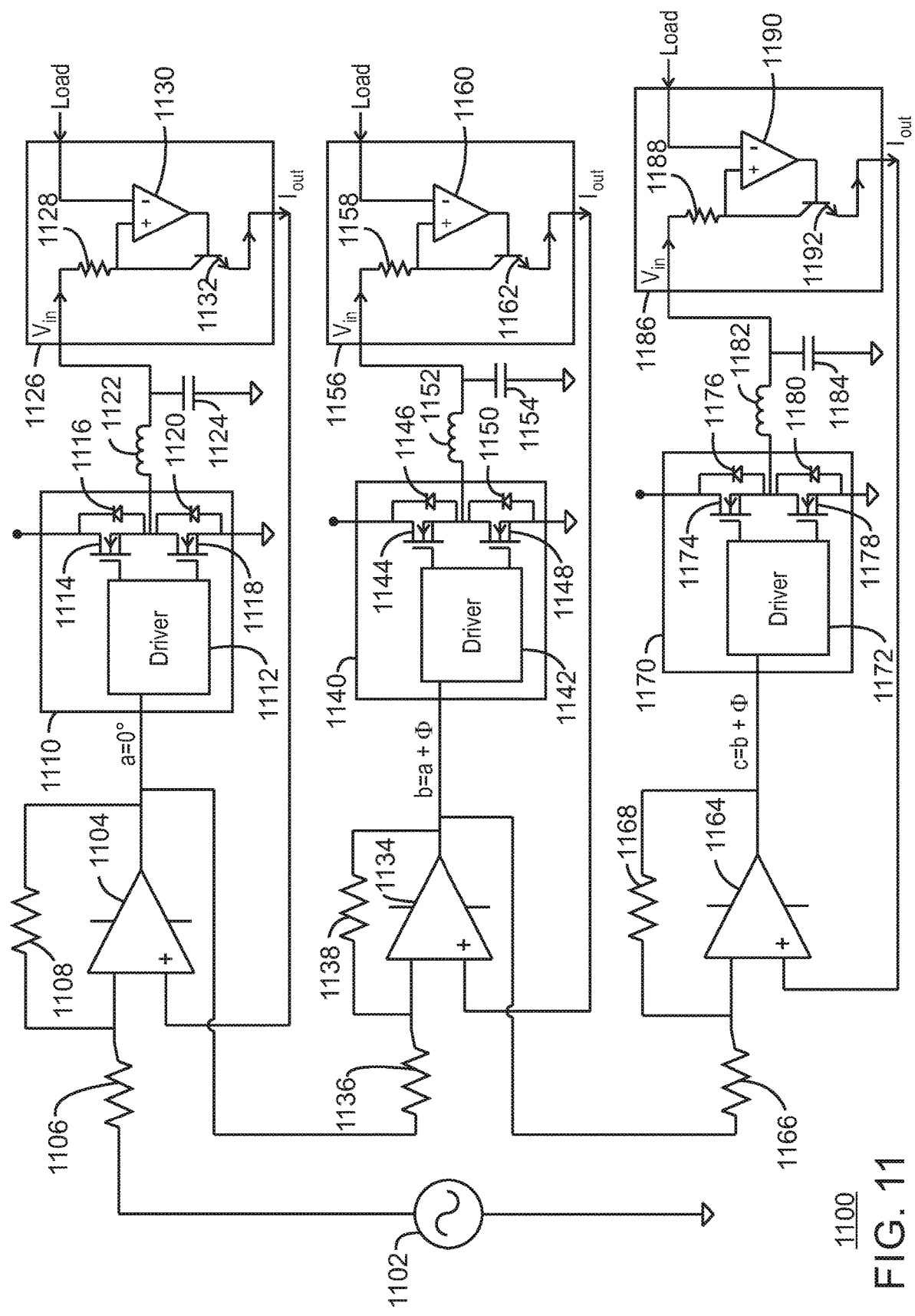
FIG. 11 illustrates a voltage regulator system.

FIG. 11 illustrates a system 1100 in accordance with some embodiments. System 1100 includes power 1102, an operational amplifier (Opamp) 1104, a resistor 1106, a resistor 1108 and a voltage regulator 1110 (for example, a shifting voltage regulator 1110). Voltage regulator 1110 includes a driver 1112, a transistor 1114, a diode 1116, a transistor 1118, and a diode 1120. An inductor 1122 and a capacitor 1124 are coupled to an output of voltage regulator 1110. A current amplifier 1126 (also referred to as a Ct amplifier or a Ct amp) is coupled to the inductor 1122 and the capacitor 1124 via a voltage input $V_{in}$. In some embodiments, Ct amp 1126 (and other Ct amps discussed herein) can be used, for example, when current is very low (for example, below sensitivity of measurement devices) in order to amplify the value and measure the same. Ct amp 1126 includes a resistor 1128, an OpAmp 1130, and a transistor 1132. A load is also input to Ct amp 1126, and Ct amp 1126 includes an output $I_{out}$ that is fed back to OpAmp 1104.

System 1100 also includes an operational amplifier (Opamp) 1134, a resistor 1136, a resistor 1138 and a voltage regulator 1140 (for example, a shifting voltage regulator 1140). Voltage regulator 1140 includes a driver 1142, a transistor 1144, a diode 1146, a transistor 1148, and a diode 1150. An inductor 1152 and a capacitor 1154 are coupled to an output of voltage regulator 1140. A Ct amp 1156 is coupled to the inductor 1152 and the capacitor 1154 via a voltage input $V_{in}$. Ct amp 1156 includes a resistor 1158, an OpAmp 1160, and a transistor 1162. A load is also input to Ct amp 1156, and Ct amp 1156 includes an output $I_{out}$ that is fed back to OpAmp 1134.

System 1100 also includes an operational amplifier (Opamp) 1164, a resistor 1166, a resistor 1168 and a voltage regulator 1170 (for example, a shifting voltage regulator 1170). Voltage regulator 1170 includes a driver 1172, a transistor 1174, a diode 1176, a transistor 1178, and a diode 1180. An inductor 1182 and a capacitor 1184 are coupled to an output of voltage regulator 1170. A Ct amp 1186 is coupled to the inductor 1182 and the capacitor 1184 via a voltage input $V_{in}$. Ct amp 1186 includes a resistor 1188, an OpAmp 1190, and a transistor 1192. A load is also input to Ct amp 1186, and Ct amp 1186 includes an output $I_{out}$ that is fed back to OpAmp 1164.

FIG. 11 illustrates phase angle shift for voltage regulators 1110, 1140 and 1170 according to some embodiments (for example, using an operational amplifier or Opamp solution). In some embodiments, a dynamic phase angle shift can be implemented. For example, a dynamic phase angle shift can be based on an actual load seen by each of the voltage regulators 1110, 1140 and 1170. In some embodiments, FIG. 11 illustrates dynamic distribution of phase angles based on loads experienced by the respective voltage regulators 1110, 1140 and 1170.

System 1100 provides a phase angle shift for voltage regulators 1110, 1140 and 1170 according to some embodiments (for example, using an operational amplifier or Opamp solution). A phase angle change is implemented at a dynamic angle using operational amplifiers 1104, 1134, and 1164, and feedback to operational amplifiers 1104, 1134, and 1164 from Ct amps 1126, 1156, and 1186, respectively. Op Amp 1104 can send an output at a same angle as the voltage source, for example, as shown by "a=0°" in FIG. 11. Op Amp 1134 can send an output shifted at a fixed angle (for example, at an angle 90 degrees or 180 degrees relative to that of Op Amp 1104). For example, in some embodiments, this is shown in FIG. 11 by "b=a+$\phi$". Op Amp 1164 can shift an output of Op Amp 1134 at a dynamic phase angle relative to that of Op Amp 1134 (for example, at a dynamic relative phase angle as between the outputs of Op Amp 1104 and of Op Amp 1134). This can be shown in some embodiments as "c=b+2$\phi$".

In some embodiments, system 1100 implements a dynamic phase angle shift based on an actual load seen by each of the voltage regulators 1110, 1140 and 1170. FIG. 11 illustrates a phase angle change at a dynamic angle (for example, at an angle ϕ between voltage regulators 1110 and 1140, and at an angle 2ϕ between voltage regulators 1140 and 1170 according to some embodiments) using one or more operational amplifier (that is, one or more OpAmp). In accordance with some embodiments, the first OpAmp 1104 can send the output at the same angle as the source (for example, the same angle as the source 1102), the second OpAmp 1134 can shift by a fixed angle (for example, can shift by a fixed angle ϕ), and the third OpAmp 1164 can shift the second OpAmp 1134 output with another angle (for example, can shift by a different angle 2ϕ). In some embodiments, the angle is dynamic between the multiple voltage regulators (for example, based on feedback such as feedback based on the loads experienced by the various voltage regulators).

In some embodiments, additional voltage regulators can be included in system 1100. In some embodiments, additional OpAmps can be included in system 1100 to shift a dynamic angle between additional voltage regulators (for example, based on feedback such as feedback based on the loads experienced by the additional voltage regulators). It is noted that system 1100 of FIG. 11 is one embodiment based on an OpAmp solution, and that in other embodiments phase angle shift can be implemented in different ways.

Figure 12:
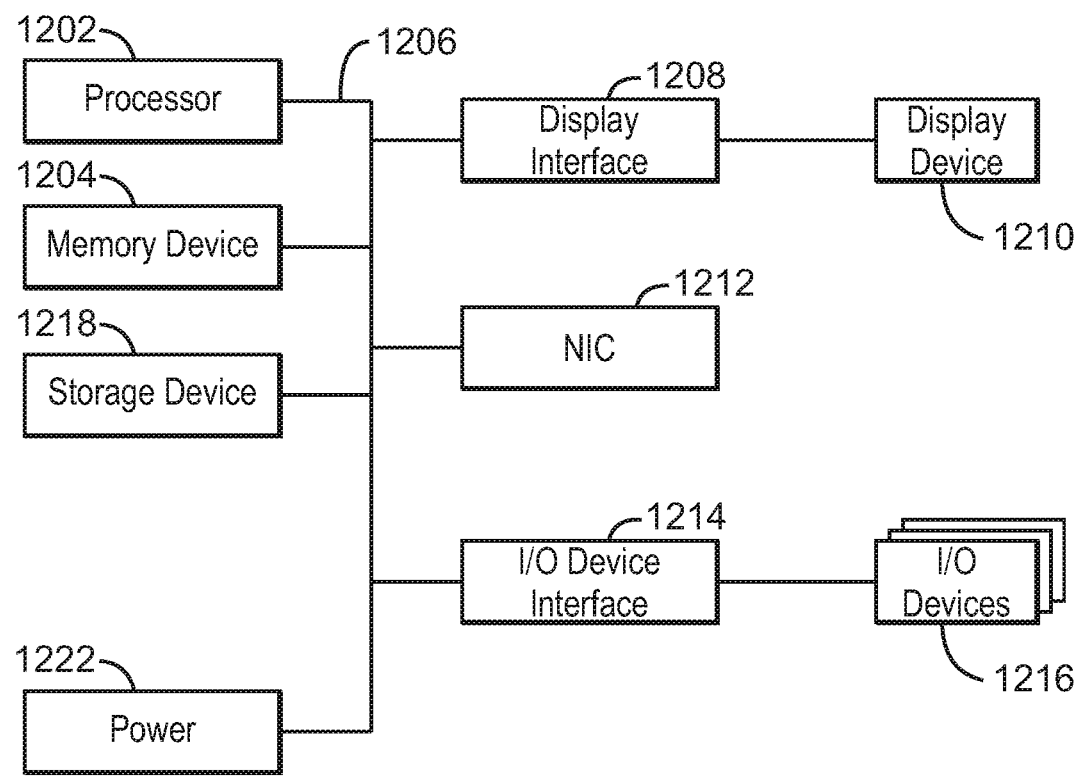
FIG. 12 illustrates a computing system.

FIG. 12 is a block diagram of an example of a computing device 1200 that can include power, power charging, power delivery, power supply, or power management according to some embodiments. In some embodiments, any portion of the circuits or systems illustrated in any one or more of the figures, and any of the embodiments described herein can be included in or be implemented by computing device 1200. The computing device 1200 may be, for example, a mobile phone, mobile device, a mobile computing system, a handset, laptop computer, desktop computer, tablet computer, or projector, among others. The computing device 1200 may include a processor 1202 that is adapted to execute stored instructions, as well as a memory device 1204 (or storage device 1204) that stores instructions that are executable by the processor 1202. The processor 1202 can be a single core processor, a multi-core processor, a computing cluster, or any number of other configurations. For example, processor 1202 can be an Intel® processor such as an Intel® Celeron, Pentium, Core, Core i3, Core i5, or Core i7 processor. In some embodiments, processor 1202 can be an Intel® x86 based processor. In some embodiments, processor 1202 can be an ARM based processor. The memory device 1204 can be a memory device or a storage device, and can include volatile storage, non-volatile storage, random access memory, read only memory, flash memory, or any other suitable memory or storage systems. The instructions that are executed by the processor 1202 may also be used to implement power, charging, power supply, power delivery, power management, or synchronization of voltage regulators, etc. as described in this specification.

The processor 1202 may also be linked through the system interconnect 1206 (e.g., PCI®, PCI-Express®, NuBus, etc.) to a display interface 1208 adapted to connect the computing device 1200 to a display device 1210. The display device 1210 may include a display screen that is a built-in component of the computing device 1200. The display device 1210 may also include a computer monitor, television, or projector, among others, that is externally connected to the computing device 1200.

In some embodiments, the display interface 1208 can include any suitable graphics processing unit, transmitter, port, physical interconnect, and the like. In some examples, the display interface 1208 can implement any suitable protocol for transmitting data to the display device. For example, the display interface 1208 can transmit data using a high-definition multimedia interface (HDMI) protocol, a DisplayPort protocol, or some other protocol or communication link, and the like In addition, a network interface controller (also referred to herein as a NIC) 1212 may be adapted to connect the computing device 1200 through the system interconnect 1206 to a network (not depicted). The network (not depicted) may be a cellular network, a radio network, a wide area network (WAN), a local area network (LAN), or the Internet, among others.

The processor 1202 may be connected through system interconnect 1206 to an input/output (I/O) device interface 1214 adapted to connect the computing host device 1200 to one or more I/O devices 1216. The I/O devices 1216 may include, for example, a keyboard or a pointing device, where the pointing device may include a touchpad or a touchscreen, among others. The I/O devices 1216 may be built-in components of the computing device 1200, or may be devices that are externally connected to the computing device 1200.

In some embodiments, the processor 1202 may also be linked through the system interconnect 1206 to a storage device 1218 that can include a hard drive, a solid-state drive (SSD), a magnetic drive, an optical drive, a USB flash drive, an array of drives, or any other type of storage, including combinations thereof. In some embodiments, the storage device 1218 can include any suitable applications. In some embodiments, the storage device 1218 can include a basic input/output system (BIOS).

In some embodiments, a power device 1222 (for example providing charging, power, power supply, power delivery, power management, power control, voltage regulation, or synchronized voltage regulation, for example) is provided. In some embodiments, power 1222 can be a part of system 1200, and in some embodiments, power 1222 can be external to the rest of system 1200. In some embodiments, power 1222 can provide any of the power, charging, voltage regulation, synchronized voltage regulation, or related techniques described herein. For example, in some embodiments, power 1222 can provide power delivery, charging, power regulation, or synchronized power regulation as described in reference to or illustrated in any of the drawings herein. In some embodiments, for example, power 1222 includes one or more elements of FIG. 1, FIG. 2, FIG. 3, FIG. 4, FIG. 5, FIG. 6, FIG. 7, FIG. 8, FIG. 9, FIG. 10 and/or FIG. 11.

It is to be understood that the block diagram of FIG. 12 is not intended to indicate that the computing device 1200 is to include all of the components shown in FIG. 12 in all embodiments. Rather, the computing device 1200 can include fewer or additional components not illustrated in FIG. 12 (e.g., additional memory components, embedded controllers, additional modules, additional network interfaces, etc.). Furthermore, any of the functionalities of power device 1222 may be partially, or entirely, implemented in hardware or in a processor such as processor 1202. For example, the functionality may be implemented with an application specific integrated circuit, logic implemented in an embedded controller, or in logic implemented in the processor 1202, among others. In some embodiments, the functionalities of power device 1222 can be implemented with logic, wherein the logic, as referred to herein, can include any suitable hardware (e.g., a processor, among others), software (e.g., an application, among others), firmware, or any suitable combination of hardware, software, and firmware.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 includes a system. In some examples, the system includes a battery, a first voltage regulator with an input, and a second voltage regulator with an input. The input of the second voltage regulator is shifted in phase relative to the input of the first voltage regulator.

Example 2 includes the system of Example 1. In some examples, the input of the first voltage regulator is a clock input and the input of the second voltage regulator is a clock input.

Example 3 includes the system of any of Examples 1 to 2. In some examples, the first voltage regulator and the second voltage regulator are synchronized.

Example 4 includes the system of any of Examples 1 to 3. In some examples, the system includes a phase shifter to shift the phase of the input to the first voltage regulator and to provide the phase shifted input to the second voltage regulator.

Example 5 includes the system of any of Examples 1 to 4. In some examples, the system includes a phase shifter to shift the phase of the input to the first voltage regulator and to provide the phase shifted input to the second voltage regulator at a fixed angle of phase.

Example 6 includes the system of any of Examples 1 to 5. In some examples, the system includes a phase shifter to shift the phase of the input to the first voltage regulator and to provide the phase shifted input to the second voltage regulator at a dynamic angle of phase.

Example 7 includes the system of any of Examples 1 to 6. In some examples, the system includes a third voltage regulator having an input that is shifted in phase relative to the input of the first voltage regulator, is shifted in phase relative to the input of the second regulator, or is shifted in phase relative to the input of both the first regulator and the second regulator.

Example 8 includes the system of any of Examples 1 to 7. In some examples, the system includes a phase shifter to shift the phase of the input to the first voltage regulator and to provide the phase shifted input to the third voltage regulator.

Example 9 includes the system of any of Examples 1 to 8. In some examples, the system includes a second phase shifter to shift the phase of the input to the second voltage regulator and to provide the phase shifted input to the third voltage regulator.

Example 10 includes the system of any of Examples 1 to 9. In some examples, the first voltage regulator is a fully integrated voltage regulator.

Example 11 includes the system of any of Examples 1 to 10. In some examples, the first voltage regulator is a switching voltage regulator and the second voltage regulator is a switching voltage regulator. In some examples, the third voltage regulator is a switching voltage regulator.

Example 12 includes a method. In some examples, the method is a method for reducing input voltage ripple. In some examples, the method includes providing an input to a first voltage regulator, shifting a phase of the input to the first voltage regulator, and providing the shifted input to a second voltage regulator.

Example 13 includes the method of Example 12. In some examples, the input to the first voltage regulator is a clock input and the input to the second voltage regulator is a clock input.

Example 14 includes the method of any of Examples 12 to 13. In some examples, the method includes synchronizing the first voltage regulator and the second voltage regulator using the input to the first voltage regulator and the input to the second voltage regulator.

Example 15 includes the method of any of Examples 12 to 14. In some examples, the method includes shifting the phase of the input to the first voltage regulator, and providing the phase shifted input to the second voltage regulator.

Example 16 includes the method of any of Examples 12 to 15. In some examples, the method includes shifting the phase of the input to the first voltage regulator, and providing the phase shifted input to the second voltage regulator at a fixed angle of phase.

Example 17 includes the method of any of Examples 12 to 16. In some examples, the method includes shifting the phase of the input to the first voltage regulator, and providing the phase shifted input to the second voltage regulator at a dynamic angle of phase.

Example 18 includes the method of any of Examples 12 to 17. In some examples, the method includes shifting a phase of an input of a third voltage regulator relative to the input of the first voltage regulator, relative to the input of the second regulator, or relative to the inputs of both the first regulator and the second regulator.

Example 19 includes the method of any of Examples 12 to 18. In some examples, the method includes shifting the phase of the input to the first voltage regulator, and providing the phase shifted input to the third voltage regulator.

Example 20 includes the method of any of Examples 12 to 19. In some examples, the method includes shifting the phase of the input to the second voltage regulator, and providing the phase shifted input to the third voltage regulator.

Example 21 includes the method of any of Examples 12 to 20. In some examples, the first voltage regulator is a fully integrated voltage regulator.

Example 22 includes the method of any of Examples 12 to 21. In some examples, the first voltage regulator is a switching voltage regulator and the second voltage regulator is a switching voltage regulator.

Example 23 includes a computing system. In some examples, the computing system includes a processor, storage to store instructions to be executed by the processor, and a power system. In some examples, the power system includes a battery, a first voltage regulator having an input, and a second voltage regulator having an input that is shifted in phase relative to the input of the first voltage regulator.

Example 24 includes the computing system of Example 23. In some examples, the input of the first voltage regulator is a clock input and the input of the second voltage regulator is a clock input.

Example 25 includes the computing system of any of Examples 23 to 24. In some examples, the first voltage regulator and the second voltage regulator are synchronized.

Example 26 includes the computing system of any of Examples 23 to 25. In some examples, the power system includes a phase shifter to shift the phase of the input to the first voltage regulator and to provide the phase shifted input to the second voltage regulator.

Example 27 includes the computing system of any of Examples 23 to 26. In some examples, a phase shifter is to shift the phase of the input to the first voltage regulator and to provide the phase shifted input to the second voltage regulator at a fixed angle of phase.

Example 28 includes the computing system of any of Examples 23 to 27. In some examples, a phase shifter is to shift the phase of the input to the first voltage regulator and to provide the phase shifted input to the second voltage regulator at a dynamic angle of phase.

Example 29 includes the computing system of any of Examples 23 to 28. In some examples, the power system includes a third voltage regulator having an input that is shifted in phase relative to the input of the first voltage regulator, is shifted in phase relative to the input of the second regulator, or is shifted in phase relative to the input of both the first regulator and the second regulator.

Example 30 includes the computing system of any of Examples 23 to 29. In some examples, a phase shifter is to shift the phase of the input to the first voltage regulator and to provide the phasehifted input to the third voltage regulator.

Example 31 includes the computing system of any of Examples 23 to 30. In some examples, the power system includes a second phase shifter to shift the phase of the input to the second voltage regulator and to provide the phase shifted input to the third voltage regulator.

Example 32 includes the computing system of any of Examples 23 to 31. In some examples, the first voltage regulator is a fully integrated voltage regulator.

Example 33 includes the computing system of any of Examples 23 to 32. In some examples, the first voltage regulator is a switching voltage regulator and the second voltage regulator is a switching voltage regulator.

Example 34 includes an apparatus. In some examples, the apparatus includes means to perform a method as in any other example.

Example 35 includes machine-readable storage. In some examples, the machine-readable storage includes machine-readable instructions, when executed, to implement a method or realize an apparatus as in any other example.

Although example embodiments of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, or the order of execution of the blocks in the diagrams may be changed, or some of the circuit elements in circuit diagrams, and blocks in block/flow diagrams described may be changed, eliminated, or combined. Any elements as illustrated or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile or non-volatile memory devices, such as storage devices or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A system comprising:
   a battery;
   a first voltage regulator having an input;
   a current amplifier to provide feedback based on a load experienced by the first voltage regulator, wherein the current amplifier includes:
      an amplifier having a first input coupled to an output of the first voltage regulator, and a second input coupled to the load experienced by the first voltage regulator; and
      a transistor having a base terminal coupled to an output of the amplifier, wherein a collector terminal of the transistor is coupled to the first input of the amplifier, and wherein an emitter terminal of the transistor is to provide the feedback, wherein the system further comprises:
   an operational amplifier to receive the feedback from the current amplifier, the operational amplifier having an output coupled to the input of the first voltage regulator; and
   a second voltage regulator having an input that is dynamically shifted in phase relative to the input of the first voltage regulator, wherein the phase is dynamically shifted based on a load experienced by the second voltage regulator.
2. The system of claim 1, wherein the input of the first voltage regulator is a clock input and the input of the second voltage regulator is a clock input.
3. The system of claim 1, wherein the first voltage regulator and the second voltage regulator are synchronized.
4. The system of claim 1, wherein the first voltage regulator is a fully integrated voltage regulator.
5. The system of claim 1, wherein the first voltage regulator is a switching voltage regulator and the second voltage regulator is a switching voltage regulator.
6. The system of claim 1, wherein the one or more load comprises one or more of a load of the first voltage regulator, a load of the second voltage regulator, and/or a load of one or more other voltage regulator of the system.
7. The system of claim 1, wherein the one or more load comprises one or more actual load.
8. The system of claim 1, wherein the one or more load comprises one or more potential load.
9. The system of claim 1, comprising:
   a second current amplifier to provide feedback based on the load experienced by the second voltage regulator; and
   a second operational amplifier to receive the feedback from the second current amplifier, the second operational amplifier having an output coupled to the input of the second voltage regulator.
10. The system of claim 1, comprising a phase shifter to shift the phase of the input to the first voltage regulator and to provide the phase shifted input to the second voltage regulator.
11. The system of claim 10, wherein the phase shifter is to shift the phase of the input to the first voltage regulator and to provide the phase shifted input to the second voltage regulator at a dynamic angle of phase.
12. The system of claim 10, comprising a third voltage regulator having an input that is shifted in phase relative to the input of the first voltage regulator, is shifted in phase relative to the input of the second regulator, or is shifted in phase relative to the input of both the first regulator and the second regulator.
13. The system of claim 12, wherein the phase shifter is to shift the phase of the input to the first voltage regulator and to provide the phase shifted input to the third voltage regulator.
14. The system of claim 12, comprising a second phase shifter to shift the phase of the input to the second voltage regulator and to provide the phase shifted input to the third voltage regulator.
15. A method for reducing input voltage ripple, comprising:
   providing feedback, via a current amplifier, based on a load experienced by a first voltage regulator, wherein the current amplifier includes:
      an amplifier having a first input coupled to an output of the first voltage regulator, and a second input coupled to the load experienced by the first voltage regulator; and
      a transistor having a base terminal coupled to an output of the amplifier, wherein a collector terminal of the transistor is coupled to the first input of the amplifier, and wherein an emitter terminal of the transistor is to provide the feedback, wherein the method further comprises;
   receiving the feedback as an input at an operational amplifier, the operational amplifier having an output coupled to an input of the first voltage regulator;
   providing feedback based on a load experienced by a second voltage regulator; and
   dynamically shifting in phase an input to the second voltage regulator relative to the input of the first voltage regulator, wherein the phase is dynamically shifted based on the load experienced by the second voltage regulator.
16. The method of claim 15, wherein the input to the first voltage regulator is a clock input and the input to the second voltage regulator is a clock input.
17. The method of claim 15, comprising synchronizing the first voltage regulator and the second voltage regulator using the input to the first voltage regulator and the input to the second voltage regulator.
18. The method of claim 15, comprising:
   shifting the phase of the input to the first voltage regulator; and
   providing the phase shifted input to the second voltage regulator at a dynamic angle of phase.
19. The method of claim 15, wherein the first voltage regulator is a fully integrated voltage regulator.
20. The method of claim 15, wherein the first voltage regulator is a switching voltage regulator and the second voltage regulator is a switching voltage regulator.
21. The method of claim 15, comprising:
   shifting the phase of the input to the first voltage regulator; and providing the phase shifted input to the second voltage regulator.

22. The method of claim 21, comprising shifting a phase of an input of a third voltage regulator relative to the input of the first voltage regulator, relative to the input of the second regulator, or relative to the input of both the first regulator and the second regulator.

23. The method of claim 22, comprising:
shifting the phase of the input to the first voltage regulator; and
providing the phase shifted input to the third voltage regulator.

24. The method of claim 22, comprising:
shifting the phase of the input to the second voltage regulator; and
providing the phase shifted input to the third voltage regulator.

25. A computing system, comprising:
a processor;
storage to store instructions to be executed by the processor; and
a power system comprising:
 a battery;
 a first voltage regulator having an input;
 a current amplifier to provide feedback based on a load experienced by the first voltage regulator, wherein the current amplifier includes:
 an amplifier having a first input coupled to an output of the first voltage regulator, and a second input coupled to the load experienced by the first voltage regulator; and
 a transistor having a base terminal coupled to an output of the amplifier, wherein a collector terminal of the transistor is coupled to the first input of the amplifier, and wherein an emitter terminal of the transistor is to provide the feedback, wherein the power system further comprises:
 an operational amplifier to receive the feedback from the current amplifier, the operational amplifier having an output coupled to the input of the first voltage regulator; and
 a second voltage regulator having an input that is dynamically shifted in phase relative to the input of the first voltage regulator, wherein the phase is dynamically shifted based on a load experienced by the second voltage regulator.

26. The system of claim 25, wherein the first voltage regulator and the second voltage regulator are synchronized.

27. The system of claim 25, the power system comprising a phase shifter to shift the phase of the input to the first voltage regulator and to provide the phase shifted input to the second voltage regulator.

28. The system of claim 25, the power system comprising:
a second current amplifier to provide feedback based on the load experienced by the second voltage regulator; and
a second operational amplifier to receive the feedback from the second current amplifier, the second operational amplifier having an output coupled to the input of the second voltage regulator.

* * * * *